Patented May 17, 1938

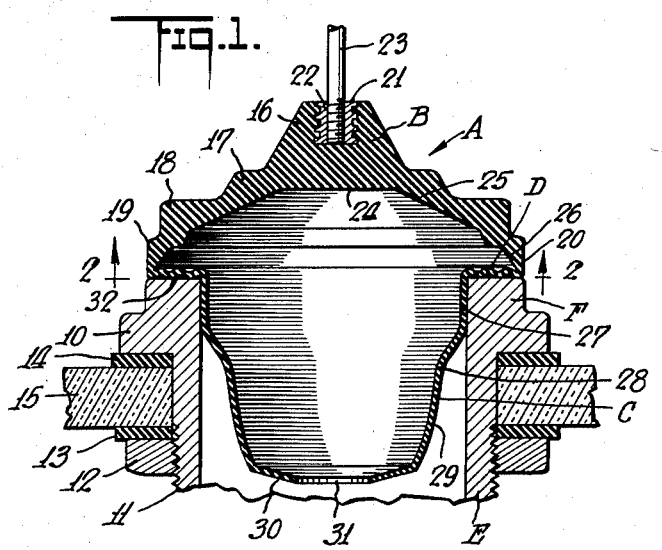
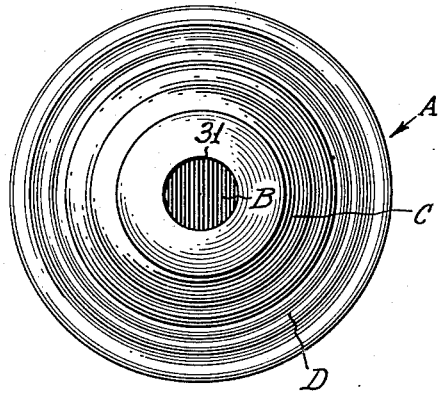
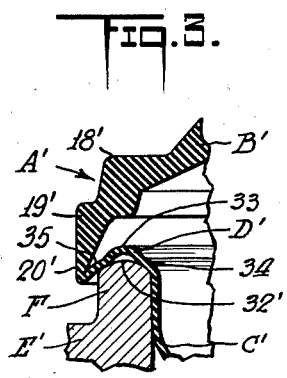

2,117,629

UNITED STATES PATENT OFFICE 2,117,629

HOLLOW RUBBER WATER STOPPER

Herman Rosenthal, Ansonia, Conn.

Application December 14, 1936, Serial No. 115,686

6 Claims. (Cl. 4—56)

The present invention relates to a stopper and it particularly relates to a shell-like stopper of flexible rubber material.

In many types of rubber ball or other shell stoppers, it has not been possible to achieve satisfactory seating of the stopper upon the inlet to the conduit, nor have the stoppers stood up well under actual conditions of usage with water of varying temperature and qualities.

It is, therefore, among the objects of the present invention to provide an improved, inexpensive, durable rubber shell stopper which will function satisfactory to cut off the water flow and which will not be readily deranged or disadvantageously affected by water of varying temperature and qualities.

Other objects will be obvious or will appear during the course of the following specification.

In accomplishing the above objects it has been found most desirable to provide a shell with a relatively heavy, stiff rubber top and a relatively thin rubber bottom portion with an intermediate substantially horizontal valving portion. The valving portion is preferably reinforced and stiffened by the relatively inflexible top portion, but at the same time it is so flexible and of such shape that it will assure positive seating and cut-off of the water flow.

In accomplishing these objects it has been found desirable in the embodiments shown in the drawings to corrugate or provide ridges in the valving portions.

The valving portions should be connected to the relatively rigid top portion at their outer peripheries and to the relatively soft and flexible bottom portions at their inner peripheries.

Referring to the drawing, which shows several of the embodiments of the present invention by way of illustration, but not by way of limitation, since many modifications and changes may be made all within the spirit and scope of the present invention.

Fig. 1 is a longitudinal side sectional view of the preferred stopper of the present invention in position on the top of a valve seat element at the end of a conduit.

Fig. 2 is a bottom view of the valve removed from its valve seat.

Fig. 3 is a fragmentary side sectional view similar to Fig. 1, but upon a large scale illustrating an alternative construction.

In Fig. 1, the valve A, consisting of a hollow shell of partly vulcanized rubber, has a relatively inflexible rubber top B and a relatively soft, flexible base C with an intermediate horizontal valving portion D. The liquid conduit E has an end portion F forming the valving seat.

As shown best in Fig. 1, the conduit E is provided with an enlargement 10 and with a threaded portion 11 cooperating with the nut 12. Between the collar 10 and the nut 12, the plate 15 is clamped between the washers 13 and 14. This plate supports the conduit E and the valve seat F.

The top B includes a frustro-conical portion 16 and steps 17 and 18 terminating in the peripheral portion 19. As indicated, the rubber is thickest and heaviest in the portion 16 and is of decreased thickness at the bottom portion 20 of the peripheral shoulder 19. The uppermost portion of the portion 16 is provided with a metallic insert 21, tapped as indicated at 22 to receive the rod 23, the lower end of which is threaded.

The interior of the head B is domed and has an uppermost horizontal surface 24 and a sloping surface 25, the periphery of which inclines sharply outwardly as indicated at 26 toward the valving portion D. The valve portion D is connected integrally to the lower portion 20 at the shoulder 19 and it is corrugated. As indicated from the inner edge of the valve portion D is connected the vertical side wall portion 27 which extends downwardly and curves at 28 into the lower conical portion 29 which terminates in the peripheral flap 30 leaving the central opening 31.

The stiff edge 20 and the flexible wall 27 support the valve surface D, which by reason of its corrugations closely adheres to the top surface 32 of the valve seat F. The combined effects of the vertical wall 27 and the stiff shoulder 19 insure that the valve surface D will not be cocked in respect to the seat 32 by particles of dirt or dust or by changes in temperature of the water. The wall 26 below the shoulder 19 is much thinner than the higher portions of the dome structure and has a flexibility approaching that of the annular valve portion D.

The valve as shown is very durable, inexpensive and will be efficient in operation over long periods of time.

In the alternative embodiment of Fig. 3, similar functioning parts operating in a similar manner as previously described and being indicated by the same numbers and letters primed, the valve face 32' is curved upwardly and the valve surface D' is concaved and provided with an elevation 33, which forms a vacuum cup. The inner periphery 34 and the outer periphery 35 closely fit the seat 32'. The operation and advantages of the device of Fig. 3 are the same as those of the device of Fig. 2. The valve portion D may also be made other than concaved, ridged or corrugated.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

What is claimed is:

1. A hollow shell rubber valve member comprising a relatively stiff, relatively thick wall rubber top portion taking the form of a dome, a lower depending cone-like flexible portion having a central opening at the bottom thereof, and an intermediate flexible, relatively thin rubber annular valving portion, said valving portion being supported rigidly at its outer periphery and flexibly at its inner periphery, and said valving portion lying substantially in a plane transverse to the longitudinal axis of the valve member and being integrally connected at its outer periphery to the lower periphery edge of the top portion and at its inner periphery to the upper peripheral edge of the lower flexible portion of the valve member, and said valving portion being solely supported by the lower periphery of said top portion and the upper periphery of said lower portion.

2. A hollow shell rubber valve member comprising a relatively stiff, relatively thick wall rubber top portion taking the form of a stepped dome, a lower depending cone-like flexible portion having a central opening at the bottom thereof, and an intermediate flexible, relatively thin rubber annular valving portion, said flexibility being such as to enable said valving portion to conform itself readily to the shape of the valve seat, said valving portion being supported rigidly at its outer periphery and flexibly at its inner periphery, said valving portion being corrugated, and said valving portion lying substantially in a plane transverse to the longitudinal axis of the valve member and being integrally connected at its outer periphery to the lower peripheral edge of the top portion and at its inner periphery to the upper peripheral edge of the lower flexible portion of the valve member, and said valving portion being solely supported by the lower periphery of said top portion and the upper periphery of said lower portion.

3. A hollow shell rubber valve member comprising a relatively stiff, relatively thick wall rubber top portion taking the form of a dome, a lower depending cone-like flexible portion having a central opening at the bottom thereof, and an intermediate flexible, relatively thin rubber annular valving portion, said flexibility being such as to enable said valving portion to conform itself readily to the shape of the valve seat, said valving portion being supported rigidly at its outer periphery and flexible at its inner periphery, said valving portion being concaved, and said valving portion lying substantially in a plane transverse to the longitudinal axis of the valve member and being integrally connected at its outer periphery to the lower peripheral edge of the top portion and at its inner periphery to the upper peripheral edge of the lower flexible portion of the valve member, and said valving portion being solely supported by the lower periphery of said top portion and the upper periphery of said lower portion.

4. A hollow shell rubber valve member comprising a relatively stiff, relatively thick wall rubber top portion taking the form of a dome, a lower depending cone-like flexible portion having a central opening at the bottom thereof, and an intermediate flexible, relatively thin rubber annular valving portion, said flexibility being such as to enable said valving portion to conform itself readily to the shape of the valve seat, said valving portion being supported rigidly at its outer periphery and flexibly at its inner periphery, said valving portion having a suction recess, and said valving portion lying substantially in a plane transverse to the longitudinal axis of the valve member and being integrally connected at its outer periphery to the lower peripheral edge of the top portion and at its inner periphery to the upper peripheral edge of the lower flexible portion of the valve member, and said valving portion being solely supported by the lower periphery of said top portion and the upper periphery of said lower portion.

5. A hollow shell rubber valve member comprising a relatively stiff, relatively thick wall rubber top portion taking the form of a dome, a lower depending cone-like flexible portion having a central opening at the bottom thereof, and an intermediate flexible, relatively thin rubber annular valving portion, said flexibility being such as to enable said valving portion to conform itself readily to the shape of the valve seat, said valving portion being supported rigidly at its outer periphery and flexibly at its inner periphery, said valving portion being substantially the same thickness as the depending bottom portion, and said valving portion lying substantially in a plane transverse to the longitudinal axis of the valve member and being integrally connected at its outer periphery to the lower peripheral edge of the top portions and at its inner periphery to the upper peripheral edge of the lower flexible portion of the valve member, and said valving portion being solely supported by the lower periphery of said top portion and the upper periphery of said lower portion.

6. A hollow shell rubber valve member comprising a relatively stiff, relatively thick wall rubber top portion taking the form of a dome, a lower depending cone-like flexible portion having a central opening at the bottom thereof, and an intermediate flexible, relatively thin rubber annular valving portion, said flexibility being such as to enable said valving portion to conform itself readily to the shape of the valve seat, said valving portion being supported rigidly at its outer periphery and flexibly at its inner periphery, said valving portion being substantially thinner than the top portion and of substantially the same thickness as the depending bottom portion, said upper portion being stepped and the uppermost step being recessed to receive a threaded sleeve for attachment to a valve rod, and said valving portion lying substantially in a plane transverse to the longitudinal axis of the valve member and being integrally connected at its outer periphery to the lower peripheral edge of the top portion and at its inner periphery to the upper peripheral edge of the lower flexible portion of the valve member, and said valving portion being solely supported by the lower periphery of said top portion and the upper periphery of said lower portion.

HERMAN ROSENTHAL.